United States Patent [19]

Mosley et al.

[11] Patent Number: 5,630,058
[45] Date of Patent: May 13, 1997

[54] NETWORK CONNECTED DEVICE PROTECTION

[75] Inventors: Joseph M. Mosley; Walter N. Zalph, both of Boca Raton, Fla.

[73] Assignee: International Business Machines Corporation, Armonk, N.Y.

[21] Appl. No.: 322,627

[22] Filed: Oct. 13, 1994

[51] Int. Cl.[6] ................................................... G06F 11/30
[52] U.S. Cl. ............................................................. 395/187.01
[58] Field of Search ............................... 395/187.01, 186, 395/185, 182.02, 183.19, 185.01, 183.01; 371/20.1, 20.5, 20.6

[56] References Cited

U.S. PATENT DOCUMENTS

| | | | |
|---|---|---|---|
| 3,982,180 | 9/1976 | Vaiden | 324/51 |
| 3,983,338 | 9/1976 | Mathauser | 179/175.2 |
| 4,097,696 | 6/1978 | Nyhuis et al. | 179/2 A |
| 4,155,073 | 5/1979 | Ulch et al. | 340/147 R |
| 4,491,838 | 1/1985 | West | 340/825.05 |
| 4,514,845 | 4/1985 | Starr | 395/183.19 |
| 4,519,070 | 5/1985 | Bell | 370/88 |
| 4,551,671 | 11/1985 | Annunziata et al. | 324/51 |
| 4,652,698 | 3/1987 | Hale et al. | 380/24 |
| 4,924,457 | 5/1990 | Shimizu | 370/56 |
| 4,951,283 | 8/1990 | Mastrocola et al. | 395/183.19 |
| 5,193,177 | 3/1993 | Burri | 395/183.19 |
| 5,394,542 | 2/1995 | Frey et al. | 395/183.19 |
| 5,402,431 | 3/1995 | Saadeh et al. | 371/67.1 |
| 5,406,260 | 4/1995 | Cummings et al. | 340/568 |

*Primary Examiner*—Robert W. Beausoliel, Jr.
*Assistant Examiner*—Joseph E. Palys
*Attorney, Agent, or Firm*—Karl O. Hesse; Anthony N. Magistrale

[57] ABSTRACT

A network protection method and apparatus are disclosed for alerting an operator when a terminal device is disconnected from the network. A network controller adapter is connected to a network control computer. The network controller periodically stops normal data communication and scans some or all of the network ports to ascertain the present and absent status of a terminal device at each port. Status is detected by passing a current through a port and measuring the feedback voltage. If the status changes between scans, an operator is alerted by sounding an alarm at the network control computer or by other steps such as dialing a telephone number and transmitting a stored message or by transmitting an alarm message over the network to one of the terminal devices such as a personal computer.

7 Claims, 4 Drawing Sheets

NETWORK CONNECTED DEVICE PROTECTION

BACKGROUND OF THE INVENTION

This invention relates to the protection of computers and other electronic devices of the type that can be attached to a network of such devices.

U.S. Pat. No. 3,983,338 teaches a switch and a resistor or capacitor mounted in a telephone connector jack. These components supplement the ringing circuits that were also used to detect unauthorized telephone sets on a subscribers line. The switch allows the phone company to determine the operability of the subscriber line even when the subscriber has unplugged all phones. This patent also discusses monitoring other lines and the equipment attached thereto for the purpose of detecting the removal of equipment such as amplifiers by theft or inadvertence. Checking is accomplished by sending a signal over the line to the subscribers station and measuring the amount of deviation produced in the signal by the components at the station. These teachings require the jacks at all subscriber stations to be changed which is not a practical solution.

U.S. Pat. No. 3,982,180 teaches apparatus for testing for continuity, shorts and correct connection of multiconductor cables. A plurality of zener diodes are connected to the cable wires at one end and a DC voltage and resistance is selectively connected to the other ends of the cable wires while monitoring the currents generated in the wires. These teachings are impractical for the purposes of the instant invention because one must enter to each subscriber station to connect the diodes.

U.S. Pat. No. 4,551,671 teaches apparatus for detecting faults in the wiring connections to data terminal equipment. Pluggable connectors and wall connectors of the self shorting type are used and test currents are measured.

U.S. Pat. No. 4,491,838 teaches a star loop network. The network operates as a loop circuit during normal operation but becomes a star configuration for trouble shooting.

U.S. Pat. No. 4,924,457 teaches apparatus for detecting and stopping tariff charges on intra-office connections.

U.S. Pat. No. 4,519,070 teaches message re-routing in response to the power-on or fault status of connections to other stations in the network.

SUMMARY OF THE INVENTION

It is an advantageous effect of the invention that it may be used with standard coax cable and standard impedance sources and that no changes need to be made in the devices or their cable attachments to the network.

It is a further advantage that standard fifty ohm terminating resistors in each terminal device provide the DC current path which is used to sense the presence or absence of a terminal device, at a port connection node.

It is a still further advantage that the, security of a terminal device may be checked in the absence of power at the terminal device.

These and other advantages of the invention are obtained by periodically applying a DC current at a port and measuring the voltage that results across the line. The multiplexor control logic performs the DC current application and controls a register to maintain a status record for each port. An alarm is generated when a change in impedance indicates that a security breach has occurred at a port.

DESCRIPTION OF THE PREFERRED EMBODIMENT(S)

Figure 1:
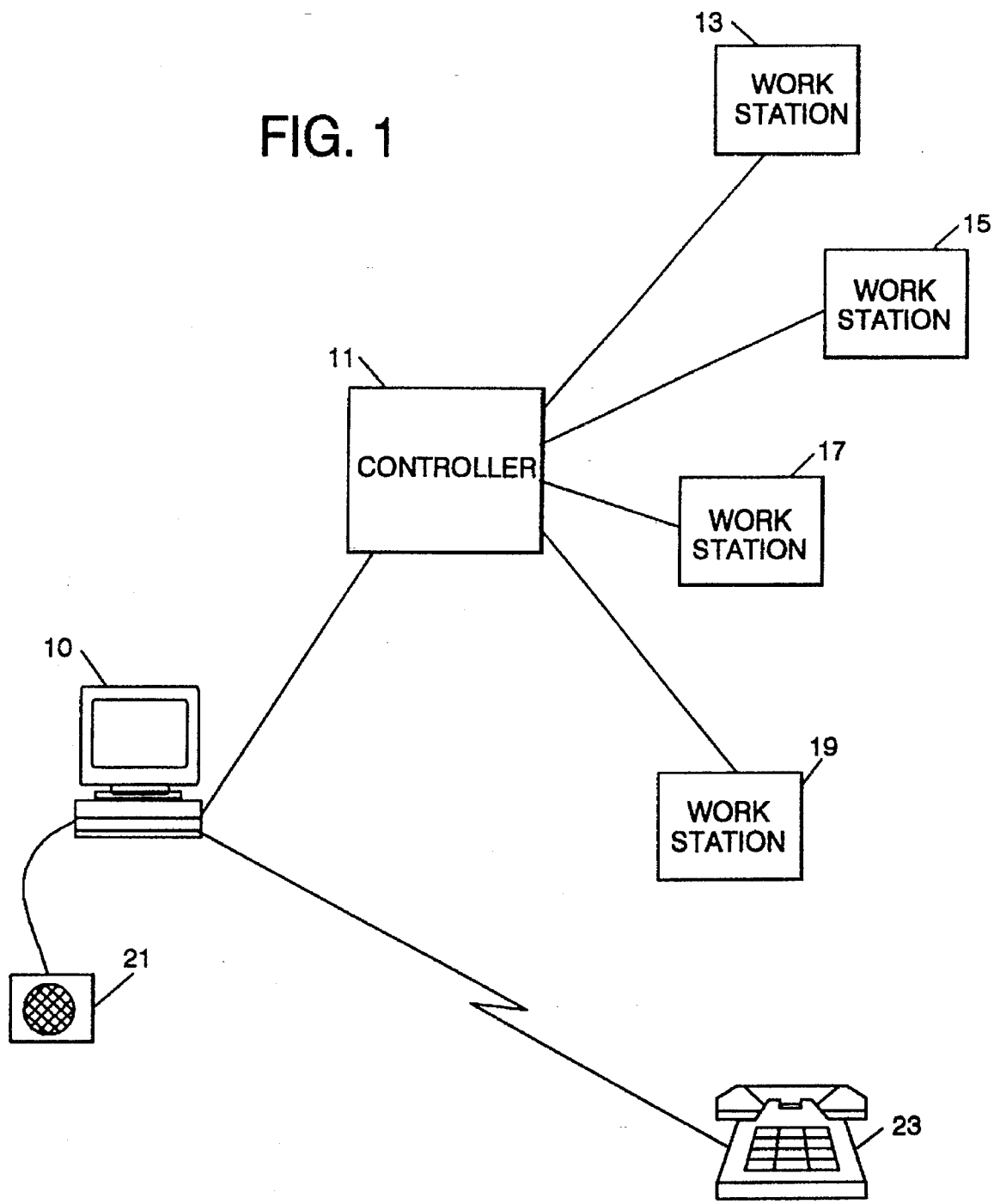
FIG. 1 shows a network of computers according to the invention.

FIG. 1 shows a network of computers in accordance with the invention. Workstation devices 10, 13, 15, 17, and 19 are attached to network controller 11 using the ports shown in FIG. 2 with standard coax cabling. Each workstation device presents a fifty ohm impedance to the network at the frequencies used by the network for signaling. Worksation 10 is a network controlling computer 10 from which an operator can monitor, configure and otherwise control the network. An audio alarm 21 and a modem and telephone connection is provided at computer 10. The modem connection may be used to dial a remote telephone 23. Either of these devices 21 and 23 may be used to provided the alarm to an operator that a security breach has been detected by the controller 11.

Figure 2:
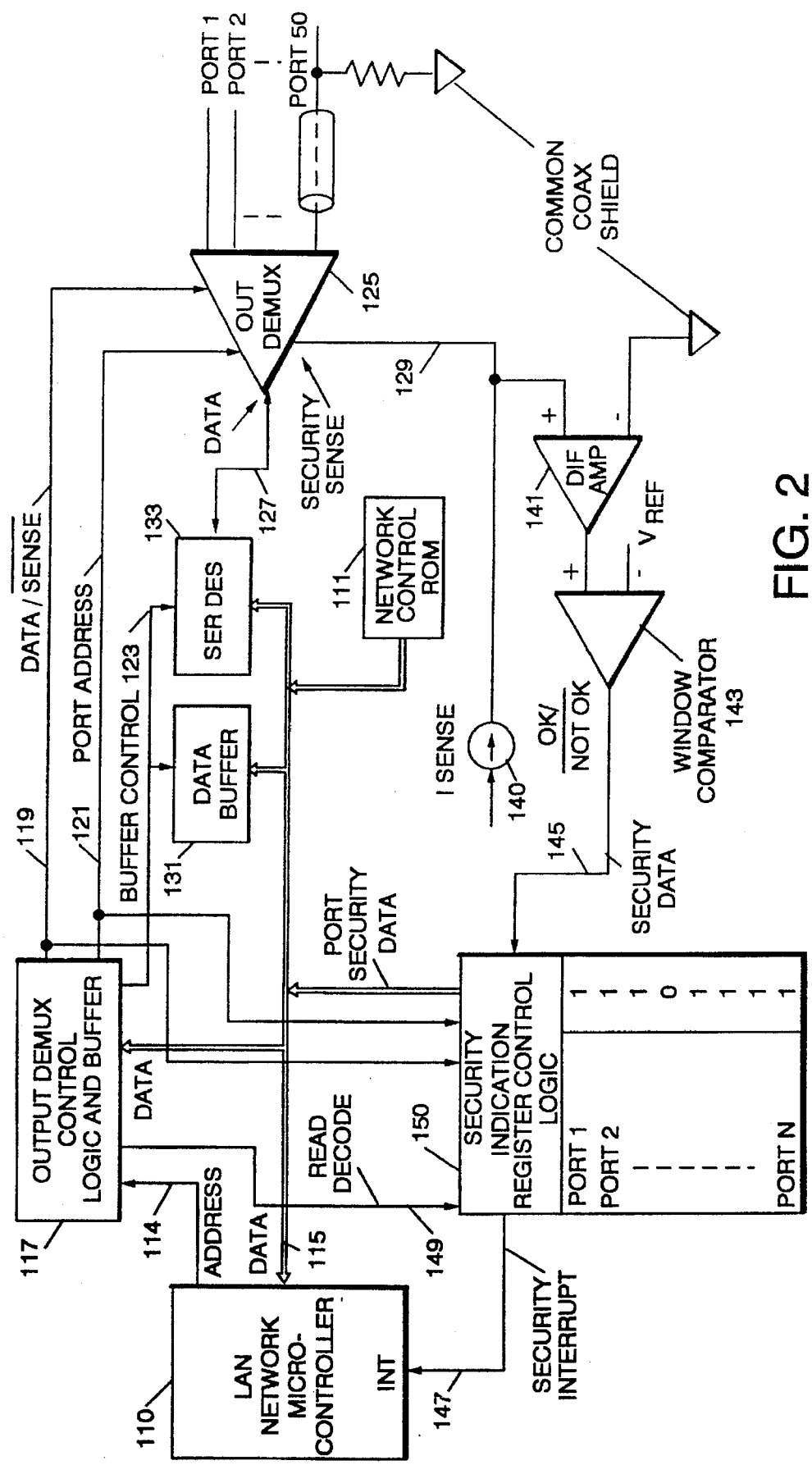
FIG. 2 is a network controller and computer for control and protection of devices on the network in accordance with the invention.

FIG. 2 shows a network controller for control and protection of devices on a Local Area Network (LAN) in accordance with the invention. A computer in the form of microprocessor 110 in conjunction with the network control program in Read Only Memory (ROM) 111 controls the network server functions, the I/O and basically acts as the interface between the host PC workstation 10 from which the network controller is controlled and the network terminals 13 through 19. Processor 110 has an address bus 114 and a data bus 115 with which to communicate with the other parts of the network controller.

A major part of such control is accomplished through the multiplex control logic and buffer control 117 which is connected to processor 110 by the address and data busses 114 and 115 respectively. Control logic 117 receives commands from the processor 110 which it decodes and converts to signals on it's output lines to the major elements of the network controller. Address bus 114 is also connected to network control ROM 111 in order to provide the sequence of instructions which are used by the processor 110 to control the operation of the network controller. Logic 117 controls multiplexor demultiplexor (DEMUX) 125 with line 119 to receive data or sense security information. Line 121 from logic 117 defines the port address from which data or sense information is to be received. Buffer control line 123 connects the logic 117 to data buffer 131 and to serializer/deserializer (SERDES) 133. The SERDES 133 performs the parallel to serial and serial to parallel data format conversions necessary to interface the serial communications network to the network controller 11. For this purpose, data bus 115 also is connected to data buffer 131 and SERDES 133 to pass data to and from the network controller.

Referring now again to DEMUX 125, data is passed to and from the network controller via SERDES 133 and tile data port line 127 connected to DEMUX 125. DEMUX 125 uses the port address on line 121 to select which of ports one through n will be connected to send and receive data through SERDES 133. Security sense information passes through the security sense line 129 connected to DEMUX 125.

Sense current is generated by current generator 140 and sent out to the various terminal devices by DEMUX 125 in a scanning sequence determined by the sequence of port addresses provided by the network control program operating through the processor 110 and logic 117. As each terminal is provided with current, the voltage drop across that terminal's port is sensed by differential amplifier 141 which is connected to window comparator 143 for comparison of the feedback sense voltage with a reference value Vref. Comparator 143 determines if the sensed voltage is within the allowable voltage window that is expected, based upon the previous status of the port. That is, if a terminal device was connected, the 50 ohm DC resistance of it's matching source impedance is expected to produce a voltage within a certain tolerance range of voltages when combined with the impedance of the coax communication line and excited with a DC current such as forty milliamperes.

After being compared, the feedback voltage becomes a binary ok/not ok signal which is sent on line 145 to the security register 150 for storage with the port identification. Security register 150 is a specialized register which maintains the security status for each client port. This register has comparison logic which stores the sense data and generates an interrupt to the processor 110 on line 147 whenever a security breach is detected at a port as indicated by a change of resistance to place the feedback voltage outside of the expected range. It will be appreciated by those skilled in the art that the logic of register 150 could also have been implemented in programming and executed by processor 110.

Other connections to security register 150 include the port address lines 121 for carrying the port information which will be stored with the ok-not ok information received on line 145. The data/sense line 119 which controls the DEMUX 25 is also connected to security register 150 so that register 150 does not store anything but sense data and becomes inactive during normal data transfers. Finally, a read decode line connects logic 117 to security register 150. Logic 117 decodes read status commands that are received from processor 110 and activates line 149. When line 149 is active, security register 150 sends the status information out to processor 110 over bus 115 for a port as identified by the port address on lines 121.

Although logic 117 and register 150 are implemented as separate circuits in our embodiment, many of the functions that are performed by these circuits could be implemented in processor 110 by programmed instructions stored in network control ROM 111 or by similar programming in the network control workstation 10.

Operation of the Preferred Embodiment(s)

Figure 3:
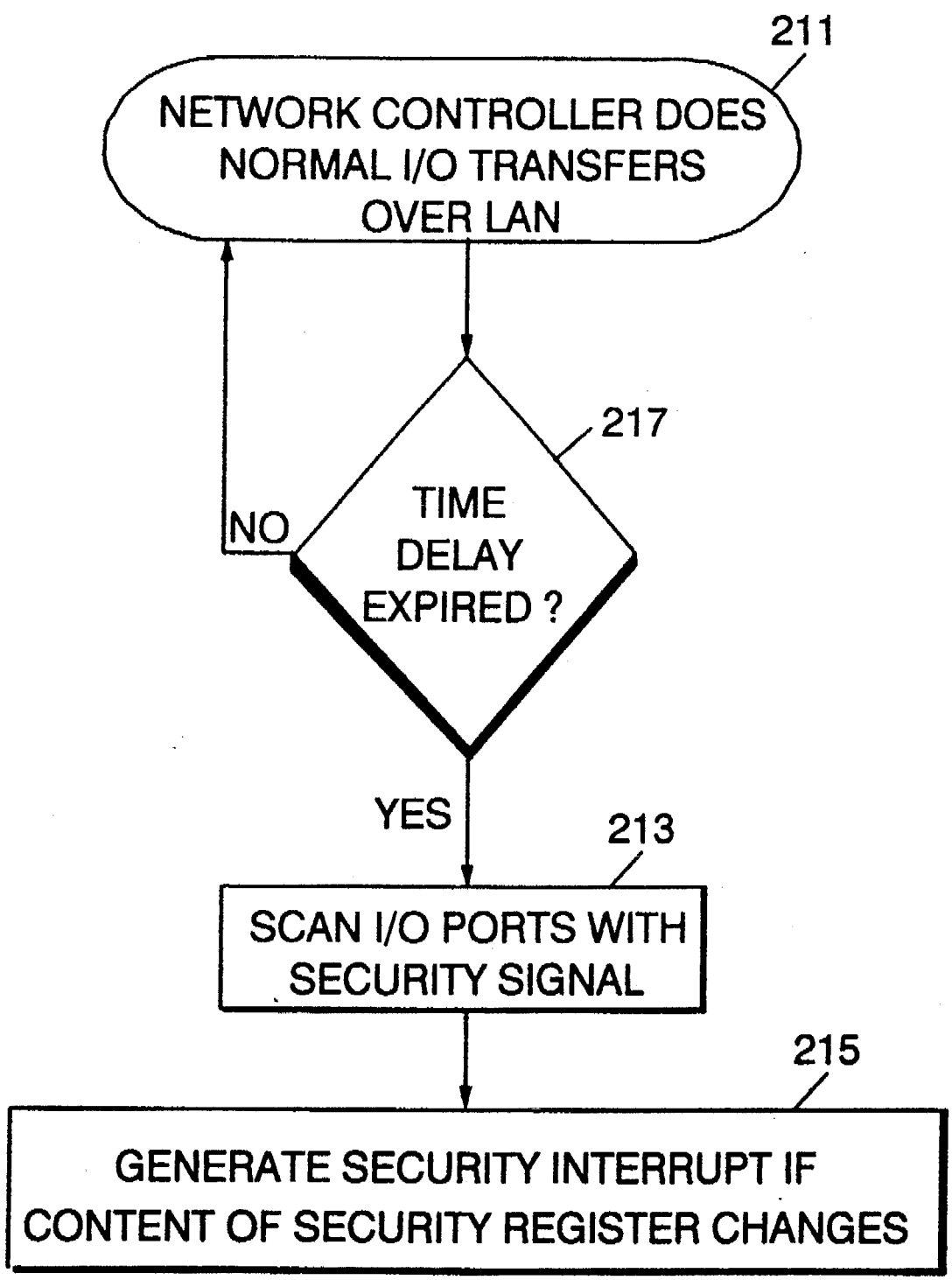
FIG. 3 is a flow diagram of the data mode to security sense mode change.

Referring now to FIG. 3, a high level flow diagram is shown depicting the sequence of data and security information transmission. At block 211, the network controller 11 performs normal input output data transfers over the LAN. After the expiration of a predetermined time delay, the normal data transfers are interrupted and a security scan of the ports is undertaken at block 213. It will be understood by those skilled in the art that the selection of ports is under processor control and therefore if one or more ports do not have a terminal device attached, time can be saved by not scanning those unused ports. In the alternative, if there is a concern that unauthorized terminal devices may be attached to the network, all ports can be scanned. During the scan, current is driven into each port in sequence and the feedback voltage is measured. If the feedback voltage is within the expected range of a window of voltages, an ok signal is stored for that terminal. If the feedback voltage is outside of the expected range, a not ok signal is stored. When the received status sensed at a port changes, an interrupt is generated and sent to processor 110 by block 215.

Figure 4:
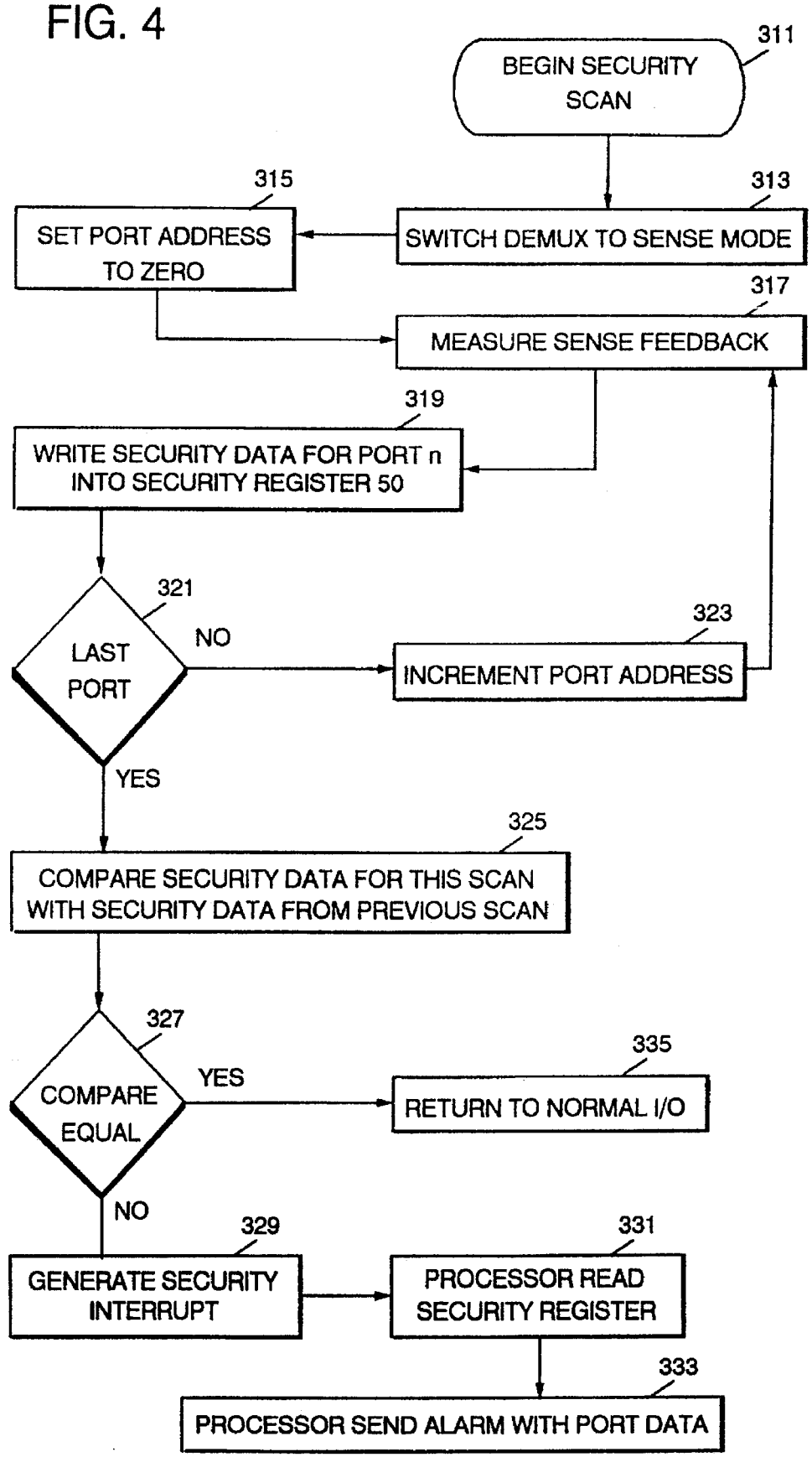
FIG. 4 is a flow diagram showing the steps of testing a plurality of ports in accordance with the invention.

Referring now to FIG. 4, a more detailed flow diagram is set forth showing some of the control signals used in the security scan sequence. At block 311, the security scan is started by switching the control line 119 to sense mode which allows the sense current to flow out of DEMUX 125 at block 313. At block 315, the port address is set to all zeros so that the security scan of the ports starts at port zero. It will be recognized that the scan could start at any port and many even be a random scan of less than all the ports rather than being a sequential scan starting at zero.

At block 317, the feedback security voltage is converted to a binary ok not ok signal and written into security register 150 along with the port identification at block 319. At decision block 321, a check for the last port is made and if not the last port, the port address is incremented at block 323 and the flow returns to block 317. If the last port has been sensed, the flow continues to block 325 where the new sensed security data is compared by comparison logic at block 327 with the sensed security data from a previous security scan. If a difference appears, that means that a terminal device has either been removed or has been added to the network and a security interrupt is generated at block 329 to processor 110.

The security interrupt causes the processor 110 to jump to a security routine in ROM 111 and read register 150 at block 331 to identify the port where the security breach occurred. The security routine then continues as programmed in block 333 to alert an operator by for example sending a message over the LAN to control terminal 10 to generate an audio alarm or to dial a preselected telephone number. It will be recognized that the alarm could as well be generated by processor 110 and sent directly to a speaker or a modem not shown which would be directly attached to controller 11.

When the security data from sequential scans compare equal, there has been no detected security breach and the flow returns at block 335 to normal I/O data transfer in block 211 of FIG. 3.

Having described the invention in terms of a preferred embodiment thereof, it will be recognized by those skilled in the art of computer peripheral equipment design that various additional changes in the structure and programming of the implementations described can be made without departing from the spirit and scope of the invention which is measured by the following claims.

What is claimed is:

1. A network controller comprising:
   a security signal generator for periodically providing a security signal on at least one port of said network, said port performing normal data transfers between said periods when said security signal is provided;
   a security sensor connected to said port for sensing during one period, a first feedback signal from said port, said first feedback signal being a response by a normal impedance of a terminal device to said security signal without regard to operation of said terminal device and providing a first security data during said one period, said security sensor sensing during another period, a second feedback signal when a terminal device is not connected to said port, and providing a second security data during said another period;
   security logic connected to said sensor and responsive to said sensor for comparing said first security data with said second security data in order to determine if said terminal device has been removed from said port and to determine if said terminal device has been added to said port; and an alarm connected to said security logic and responsive to said security logic for alerting an operator when said security logic has determined that said terminal device has been removed from said port and when said security logic has determined that said terminal device has been added to said port.

2. The network controller of claim 1 wherein:

said security signal generator is a current generator; and said security signal sensor is a voltage sensor.

3. The network controller of claim 1 wherein said security logic further comprises:

a comparator for comparing said feedback signals with a reference signal to generate said security data for said port;

register control logic connected to said comparator for storing an identification of said port and for storing said security data.

4. The network controller of claim 3 further comprising:

comparison logic in said security logic for comparing said security data for said port with a previous security data for said port and determining that said terminal device has been disconnected from said port when said security data represents a second feedback signal and said previous security data represents a first feedback signal.

5. The method of controlling a network comprising the steps of:

periodically providing a security signal on at least one port of said network, said port performing normal data transfers between said periods when said security signal is provided;

sensing during one period, a first feedback signal from said port, said first feedback signal being a response by a normal impedance of a terminal device to said security signal without regard to operation of said terminal device and providing a first security data during said one period, said security sensor sensing during another period, a second feedback signal when a terminal device is not connected to said port, and providing a second security data during said another period;

responding to said sensor and comparing said first security data with said second security data in order to determine if said terminal device has been removed from said port and to determine if said terminal device has been added to said port; and alerting an operator when said security logic has determined that said terminal device has been removed from said port and when said security logic has determined that said terminal device has been added to said port.

6. The method of claim 5 further comprising the steps of:

comparing said feedback signals with a reference signal to generate said security data for said port;

storing an identification of said port and storing said security data.

7. The method of claim 6 further comprising the steps of:

comparing said security data for said port with a previous security data for said port and determining that said terminal device has been disconnected from said port when said security data represents a second feedback signal and said previous security data represents a first feedback signal.

\* \* \* \* \*